March 8, 1949.  G. C. MALONE ET AL  2,463,987
DUMP TRUCK SCRAPER

Filed Oct. 19, 1946  4 Sheets-Sheet 1

INVENTORS
GROVER C. MALONE
ELLIS M. MALONE
BY Weatherford and Weatherford attys

March 8, 1949. G. C. MALONE ET AL 2,463,987
DUMP TRUCK SCRAPER
Filed Oct. 19, 1946 4 Sheets-Sheet 2
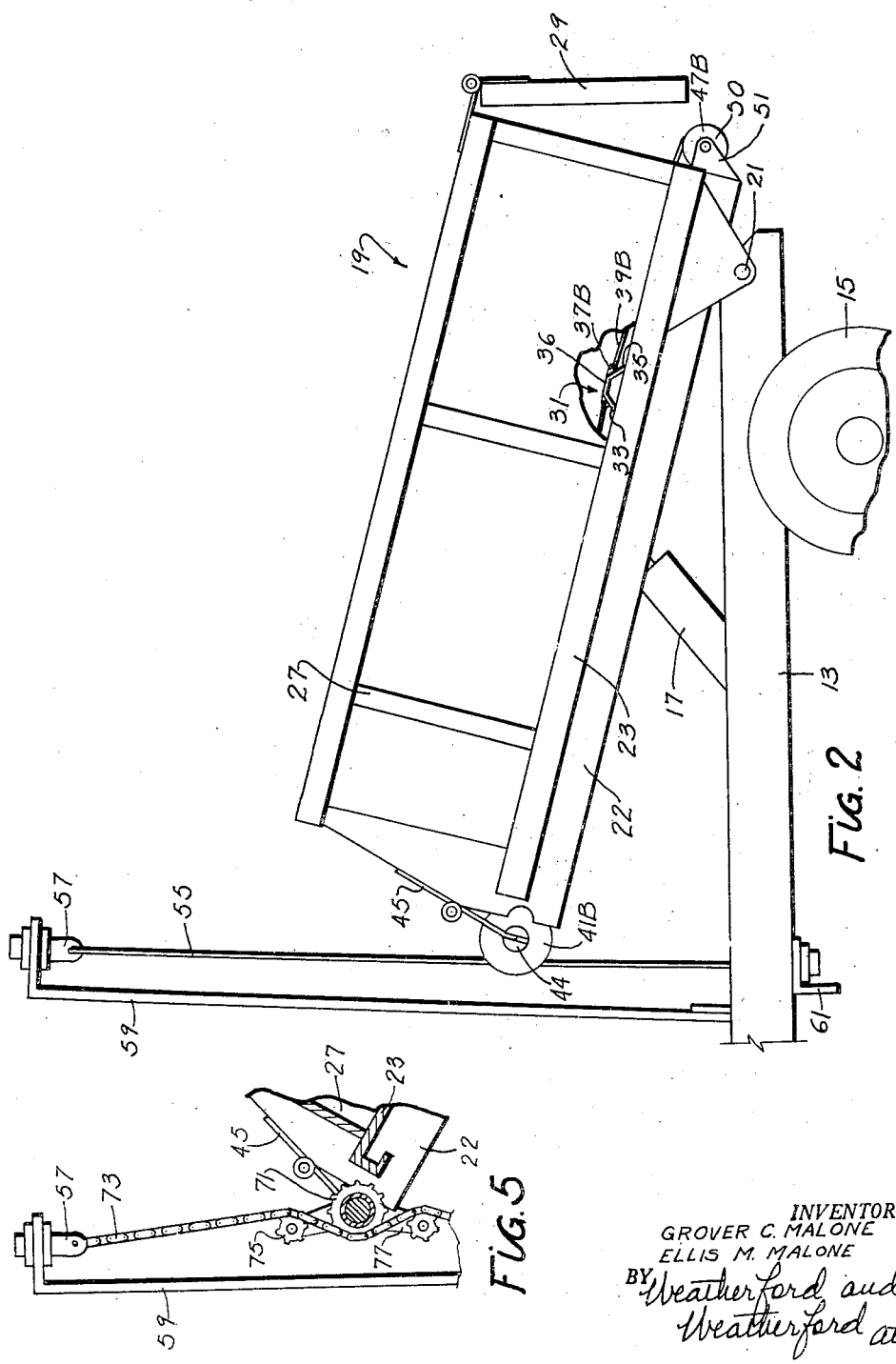
INVENTORS
GROVER C. MALONE
ELLIS M. MALONE
BY Weatherford and
Weatherford attys

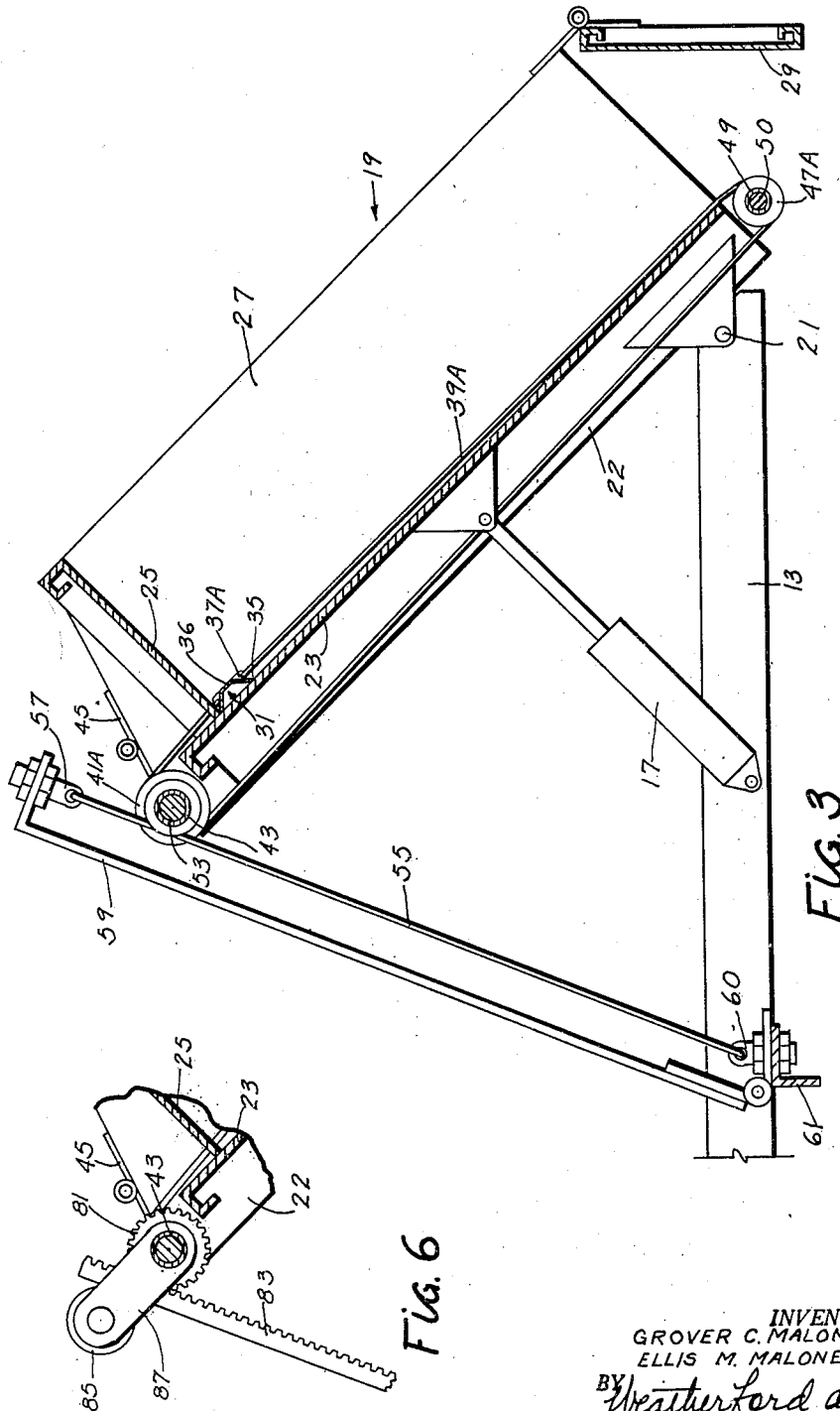

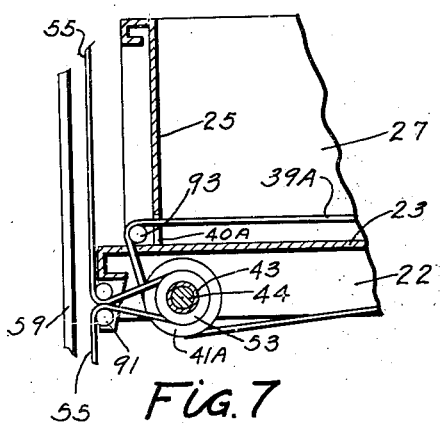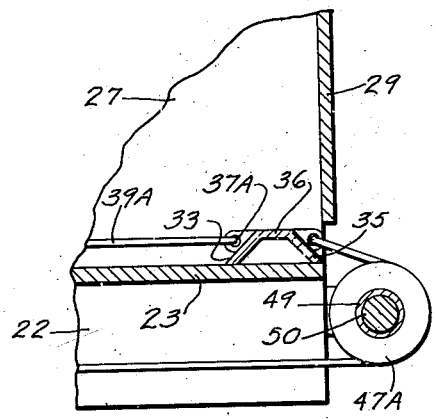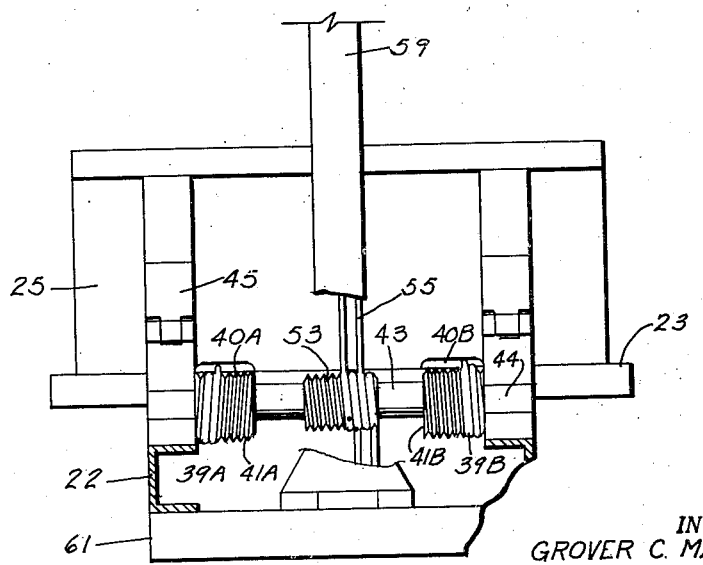

Patented Mar. 8, 1949

2,463,987

UNITED STATES PATENT OFFICE 2,463,987

DUMP TRUCK SCRAPER

Grover C. Malone and Ellis M. Malone,
Memphis, Tenn.

Application October 19, 1946, Serial No. 704,472

10 Claims. (Cl. 298—1)

1

This invention relates to improvements in dump trucks and particularly relates to means for removal of truck carried loads supplementing and assisting the usual deposit by gravity of such loads.

As is well known, dump trucks usually include a vehicle having an engine, a cab and a frame, and a truck body hinged to the vehicle frame and adapted to be tilted, as by having the front end raised, to permit the load carried therein to be deposited by gravity, the assembly including means for effecting the tilting of the body.

Many and varied types of loads are carried by dump trucks, some of which loads from their character, such as wet clay or the like, tend to pack into the truck body so that upon raising of the front end, discharge of the load is not successfully accomplished.

Devices have been previously known which have included a blade or the like adjacent the forward end and which have attempted to scrape the bed of the truck rearwardly as the truck is raised. Such devices have failed for the reason that instead of facilitating the discharge of the load from the truck they have mainly accomplished a packing of the load toward the discharge end by which discharge has been effectively blocked.

Other devices have been known which have been operable responsive to rotation of the truck wheels to effect scraping of the truck body after the majority of the dumping has been accomplished requiring movement of the truck in order to accomplish such purposes.

The principal object of this invention is to provide means which will facilitate the gravity unloading of a dump truck and which will supplement such facilitated gravity unloading by supplemental clearing of the truck body.

A further object is to provide such means which are operated by the movement of the truck body as it is tilted for gravity discharge of load and as it is returned to normal or load receiving position.

A further object of the invention is to provide a dump truck body with a scraping element adapted to move from the rear end to the forward end of the truck body during tilting thereof and return to the rear end of the truck body upon return movement thereof.

And a further object of the invention is to generally improve the design, utility and efficiency of such devices.

The means by which the foregoing and other objects are accomplished and the manner of their

2 accomplishment will be readily understood from the following specification upon reference to the accompanying drawings, in which:

Fig. 2 is a side elevational view of the dump truck, including the invention, with the dump body partially raised.

Fig. 3 is a longitudinal sectional view as on the line III—III of Fig. 1, showing the dump body in full raised position.

Fig. 4 is a sectional view taken on the line IV—IV of Fig. 1, with certain parts broken away for purposes of illustration.

Fig. 5 is a fragmentary side elevational view of a variation of the operating means for the device of this invention.

Fig. 6 is a view similar to Fig. 5 of a further variation of the operating means.

Fig. 7 is a fragmentary sectional elevation of the forward end of a dump body showing a variation of the mounting of the cable carrying drums of the invention; and Fig. 8 is a fragmentary side elevational view on an enlarged scale, of the rear end of the dump truck body, showing the detail of the preferred form of securing the cables to the scraper element of this invention.

Figure 1:
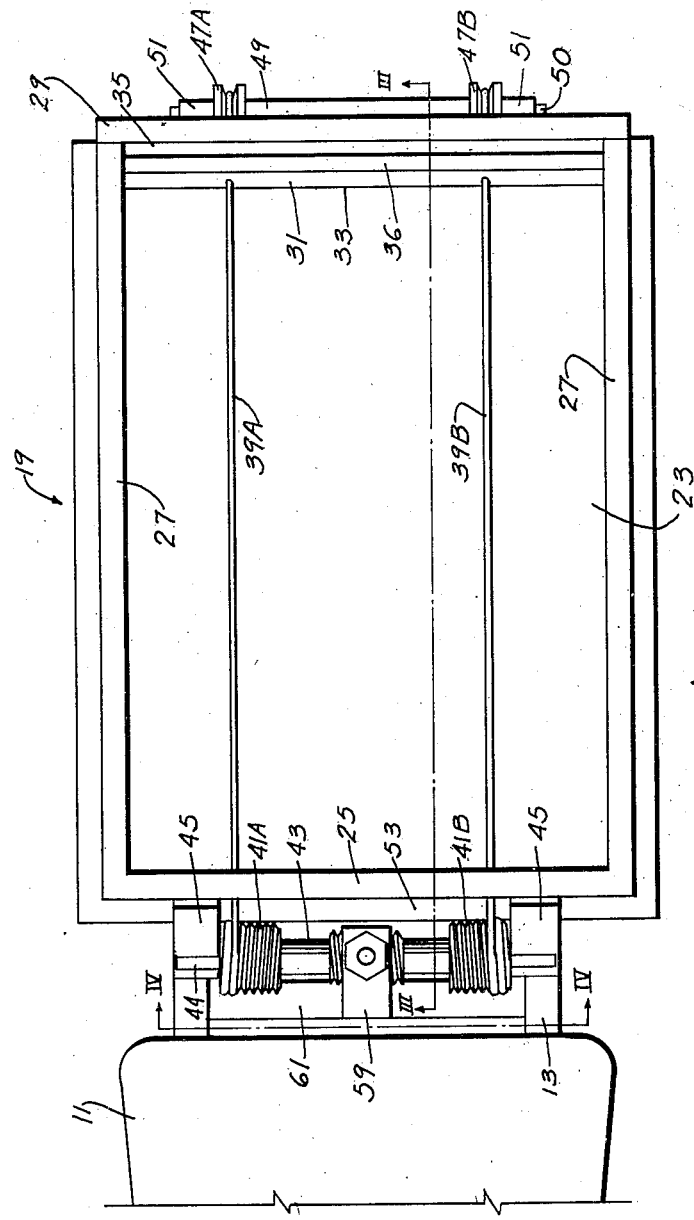
Fig. 1 is a plan view of a dump truck body in lowered position with the device of this invention applied thereto.

Referring now to the drawings in which the various parts are indicated by numerals:

The present invention is applicable to any tiltable body dump truck and is shown as mounted on a dump truck, including a cab 11, a vehicle frame 13, wheels 15, and having a conventional hydraulic jack 17 adapted to raise and lower a dump body 19 hingedly secured, as at 21, to the frame 13. The dump body includes a longitudinal frame 22 adapted to rest on the vehicle frame 13, a bed 23 supported on frame 22, a front end wall 25, and sides 27 mounted on and secured to the bed and preferably having stiffening buttresses of conventional type, and a rear gate member 29 hingedly secured at its upper end to the top of sides 27 at the rear end thereof.

This invention essentially includes a plate 31 beveled along its forward edge 33 and along its rearward edge 35, these beveled portions extending throughout the length of the plate which is sufficient to extend from side to side of the truck body. The plate is adapted to be slidably moved forwardly and rearwardly along the bed 23 with the edges of the beveled portions in contact with the bed, the ends of the plate substantially in contact with the inner surfaces of the sides 27.

and the center or web portion 36 of the plate spaced above the bed 23. The plate 31 may either be formed of a flat sheet-like member of which the respective edges are bent downwardly, or it may be formed of a solid piece on which the bevels are formed by casting or by machining. When the dump body is in lowered or normal position the plate is disposed adjacent the rear end thereof, preferably with the rear bevel 35 substantially flush with the rear edge of the bed 23.

Intermediate the length of the plate 31 are two pairs of longitudinally alined ears 37A, 37B, these pairs being spaced apart. Secured to the forward ear of pair 37A is one end of a cable 39A which extends forwardly therefrom through an aperture 40A in end wall 25 and is passed around a drum 41A, preferably spirally grooved and mounted on a sleeve 43 adjacent one end thereof, the sleeve being journalled on a shaft 44 secured to brackets 45 which are secured to the forward portion of the dump body, preferably to the conventional buttress members of the forward end wall of such body. The cable 39A passes from the drum 41A rearwardly below the bed 23 of the dump body and preferably within the longiutdinal frame thereof to and around a pulley 47A carried by a sleeve 49 adjacent one end thereof, the sleeve being journalled on a shaft 50 secured to suitable brackets 51 which are preferably secured to the rear end of the longitudinal frame 22 of the dump body, the cable then passing from the pulley forwardly over the rear end of bed 23 to the rearward ear of pair 37A to which it is secured.

In similar manner a cable 39B is secured to the ears 37B, passing forwardly through aperture 40B in end wall 25 around the spirally grooved drum 41B carried by the sleeve 43 adjacent its opposite end and thence rearwardly to and about the pulley 41B mounted on the sleeve 49. Apertures 40A, 40B are preferably formed as slots adjacent the bed 23 to allow for lateral movement of the cables and to minimize wear thereof. Drum 41A and pulley 47A are preferably mounted on their respective sleeves so as to be adjacent one end thereof and substantially in fore and aft alinement, and drum 41B and pulley 47B are mounted in similar alinement adjacent the opposite ends of the sleeves. Thus the cables 39A, 39B are preferably arranged substantially parallel and spaced well apart.

The means for accomplishing rotation of the sleeve 43 preferably include a drum 53, preferably spirally grooved and mounted centrally of the sleeve and preferably made integral therewith, the diameter of drum 53 being shown as less than the diameter of drums 41A, 41B. An operating cable 55 is suspended from an eye 57 carried by the upper end of an elongated bracket 59. Preferably the cable is passed through the eye and the opposite ends both depend therefrom. Intermediate its length the cable ends are passed around the central drum 53, and extend therebelow to a suitable anchor 60 mounted centrally on a transverse member 61 secured to the vehicle frame 13, to which anchor the cable ends are attached. Adjacent the anchor point, the bracket 59 is hingedly secured preferably to the forward edge of transverse member 61. It will thus be seen that the cable 55 is fixed to the devices carried by the vehicle frame and is passed around the central drum 53 carried by the sleeve 43 which is supported from the dump body. The relative sizes of the drums is to be determined by the ratio of the length of the body bed (the length of travel of plate 31) to the length of vertical movement of the dump body during raising.

In the operation of the device, the dump body is tilted, in the type shown this being accomplished by having the front end of the dump body raised by the actuation of the hydraulic jack 17, the raising of the front end moving the shaft 44 and sleeve 43 and the drums carried thereby upwardly and starting the load toward discharge. Responsive to this upward movement, sleeve 43 is rotated by the action of cable 45 on the central drum 53, the shaft turning freely in its mounting brackets 45. By virtue of its hinged attachment, bracket 59 is enabled to swing toward the body, so that spacing is maintained throughout the movement of the body. Upon such sleeve rotation the outer cable carrying drums 41A, 41B are rotated with the sleeve, moving the cables 39A, 39B forwardly, and as a result, moving the plate 31 forwardly oppositely to the direction of discharge movement of the load. This opposing movement of the plate is accomplished during load discharge before the load carried by the dump truck has been discharged therefrom and has the effect of loosening the bottom of the load from the bed of the dump body, permitting it to be freely discharged from the rear end or discharge portion by gravity as desired. It will be noted that the upstream movement of the plate beneath the load is facilitated by the provision of the bed-contacting forward bevel 33, the separation of the load from the bed being accomplished by the spacing of the plate web 36 above the bed of the truck. When the truck body has reached its full raised position the beveled plate will have been moved forwardly until it is substantially in contact with the front end wall 25. After gravity discharge of the load has been accomplished the dump truck body is lowered or returned to normal position in conventional manner and the return movement of the body and the sleeve 43 carried thereby effects a reverse rotation of the sleeve through the action of the cable 55 on the central drum 53, the outer drums 41A, 41B being similarly reversely rotated, the cables 39A, 39B moving rearwardly and the beveled plate 31 similarly moved to the rear. This rearward movement of the plate as the truck body descends accomplishes scraping and removal from the truck body of any residual load of which discharge was not accomplished by gravity. When the truck body has returned to its lowered or travelling position the beveled plate will have been returned to its original position with the rear bevel 35 substantially flush with the rear edge of the body bed 23.

In Fig. 5, a variation of the operating means is illustrated in which a sprocket 71 is substituted for the central drum 53, the diameter of the sprocket conforming to that of drum 53 and being determined as hereinabove discussed, the sprocket 71 being mounted on and secured to the sleeve 43. For cable 55, a chain 73 is substituted, the upper end of the chain being connected to the upper end of elongated bracket 59 in suitable fashion, the lower end of the chain being connected to anchor 60 on transverse member 61 centrally thereof and adjacent the hinge connection of the bracket thereto. The teeth of the sprocket 71 engage the links of the chain 73, this engagement being preferably maintained by supplemental sprockets 75 carried by a supplemental bracket 77 mounted on the forward end of the dump truck body, these supplemental sprockets being disposed on the side of chain 73 opposite to the side engaged by sprockets 71. It will be seen that upon raising of the front end of the dump body the sleeve 43 will be rotated through the interaction of the chain and sprocket in manner similar to the rotation of the sleeve by the inter-action of the cable 53 with the central drum 55.

In Fig. 6, a further variation of the device is shown in which a pinion 81 is substituted for central drum 55, the pinion 81 being mounted on the sleeve 43. Engaging the teeth of the pinion 81 is a rack 83 which is preferably hingedly secured to the transverse member 61 in manner similar to the securing of the bracket 59 thereto and the engagement of the rack with the pinion is preferably maintained by a roller 85 carried by plates 87 which are journalledly mounted on the sleeve 43. The roller 85 is disposed to contact the back of the rack opposite to the teeth thereof which engage the pinion. Upon tilting and return of the truck body, the sleeve 43 will be rotated by the interaction of the rack and pinion and movement of the plate 31 acordingly accomplished in manner similar to that hereinabove described.

In Fig. 7, a variation of the mounting of the shaft 44 and sleeve 43 and the drums carried thereby is shown in which the shaft is mounted in the side members of the longitudinal frame 22 of the dump body and is disposed below the bed 23 of the body, thus accomplishing a concealment of the drums, sleeve and shaft from possible damage as well as permitting, where desired, a conservation of space. In this form of mounting it is preferable that the cable 55 should be passed over upper and lower rollers 91 journalled in side members of frame 22 adjacent the forward edge of bed 23 to eliminate the possibility of damage to the cable through contact with the bed, and also to insure a direct path upwardly and downwardly for the cable.

It is also preferable that the cables 39A, 39B should be passed upwardly through suitable apertures in the forward and projection portion of the bed 23 and over a roller 93 mounted forwardly of the apertures 40A, 40B.

It will be understood that while the drums 41A, 41B and 55 have been shown in their preferable form as spirally grooved, such grooving may be eliminated therefrom, or the drums may be eliminated and the cables wrapped directly around the sleeve 43, without departing from the invention hereof. It is preferable to provide the spiral grooving, for purposes of retaining the respective cables within limited areas, and to provide positive guides for the movement of the cables. It will be noted that the central drum 55 is illustrated as being of less diameter than the drums 41A, 41B, which construction is preferable in order to enable the movement of the plate 31 throughout the length of the dump body responsive to the shorter upward and downward movement of the front end of the dump body. It will, however, be understood that drums may be made of the same size, or may be as hereinabove suggested, eliminated entirely without departing herefrom. It will be further understood that the relative size of the drums is dependent on the ratio between the length of vertical travel of the scraper plate, which latter is dependent on the length of the body bed, and that accordingly the size of the drums may be varied in accordance with the circumstances without departing herefrom.

It will further be noted that the cable 55 is shown as double wound about the drum 53. It will, however, be understood that the cable may be single wound about the drum, or otherwise wound thereabout, without departing herefrom.

It will further be noted that the cables 39A, 39B are shown as connected to the plate 31 through the medium of the ears 37A, 37B. It will be understood that the cables may be otherwise secured to the plate 31 without departing herefrom.

It will be seen that although the forward end of the dump body is moved through an arc as it is moved upwardly and downwardly, the hinged connections of bracket 59 (or rack 83) to transverse member 61, permit the cooperative movement of the bracket (or rack) therewith so that proper tension of cable 55 (or engagement of chain 71 or position of rack 83) may be maintained.

It will be understood that, while the invention has been specifically described in connection with a dump truck in which tilting for discharge is accomplished by raising the forward end, it is equally applicable to truck bodies tilted otherwise, such as, for example, a side dump truck in which the body is tilted toward one side to effect discharge therefrom.

We claim:

1. In combination with a dump truck, having a frame, a body hingedly secured to said frame adapted in normal position to receive and retain a load and being tiltable from said normal position to effect discharge movement of said load toward the discharge portion of said body, and means for accomplishing tilting of said body and return thereof to normal position, discharge assisting means which comprise a member disposed transversely to the direction of said discharge movement in contact with said body adjacent the discharge portion of said body, said member consisting of an elongated plate having a longitudinal web portion spaced from said body and longitudinal edge portions flaring downwardly from said web portion into contact with said body and being slidably movable along said body in a direction opposed to the direction of said discharge movement and away from said discharge portion during tilting of said body to loosen said load therefrom, and being reversely movable toward said discharge portion during return of said body to normal position to remove load residue from said body, and means for accomplishing the said movements of said member respectively responsive to tilting of said body and return thereof to normal position.

2. In combination with a dump truck, having a frame, a body hingedly secured to said frame and having a bed adapted in normal position of said body to receive and retain a load, said body being tiltable from said normal position to effect discharge movement of said load along said bed toward the discharge portion of said body, and means for accomplishing tilting of said body and return thereof to normal position, discharge assisting means which comprise a member disposed transversely to the direction of said discharge movement substantially in contact with said bed adjacent the discharge portion of said body, said member consisting of an elongated plate having a longitudinal web portion spaced from said bed and longitudinal edge portions flaring downwardly from said web portion into contact with said bed and being slidably movable along said bed in a direction opposed to the direction of said discharge movement and away from said discharge portion during tilting of said body to loosen said load from said bed, and being reversely movable along said bed toward said discharge portion during return of said body to normal position to remove load residue from said bed, and means for accomplishing the said movements of said member respectively responsive to tilting of said body and return thereof to normal position.

3. In combination with a dump truck, having a frame, a body hingedly secured at its rear end to said frame, said body in normal position being adapted to receive and retain a load, the forward end of said body being raisable to accomplish tilting of said body from normal position and effect rearward discharge movement of said load from said body, and means for raising and lowering the forward end of said body to respectively effect said tilting and return of said body to normal position, means for assisting discharge of said load, comprising a member disposed transversely of said body and in contact therewith adjacent the rear end thereof, said member consisting of an elongated plate having a longitudinal web portion spaced from said body and longitudinal edge portions flaring downwardly from said web portion into contact with said body and being slidably movable forwardly along said body during tilting thereof to effect loosening of said load therefrom, and being reversely movable toward said rear end during return of said body to normal position to remove load residue from said body, and means for accomplishing the said movements of said member respectively responsive to tilting of said body and return thereof to normal position.

4. In combination with a dump truck, having a frame, a body hingedly secured at its rear end to said frame, said body having a bed adapted in normal position of said body to receive and retain a load, the forward end of said body being raisable to accomplish tilting of said body from normal position and effect rearward discharge movement of said load along said bed, and means for raising and lowering the forward end of said body to respectively effect said tilting and return of said body to normal position, means for assisting discharge of said load, comprising a member disposed transversely of said bed and in contact therewith adjacent the rear end thereof, said member consisting of an elongated plate having a longitudinal web portion spaced from said bed and longitudinal edge portions flaring downwardly from said web portion into contact with said bed and being slidably movable forwardly along said bed during tilting of said body to effect loosening of said load from said bed, and being reversely movable toward said rear end during return of said body to normal position to remove load residue from said bed, and means for accomplishing the said movements of said member respectively responsive to tilting of said body and return thereof to normal position.

5. In combination with a dump truck, having a frame, a body hingedly secured to said frame, said body in normal position being adapted to receive and retain a load, said body being tiltable from normal position to effect discharge movement of said load from said body, and means for accomplishing tilting of said body and return thereof to normal position, means for assisting discharge of said load, comprising a member disposed transversely to the direction of said discharge movement in contact with said body adjacent the discharge portion thereof, said member consisting of an elongated plate having a longitudinal web portion spaced from said body and longitudinal edge portions flaring downwardly from said web portion into contact with said body, and being slidably movable along said body in a direction opposing the direction of said discharge movement during tilting of said body, to effect loosening of said load therefrom, and being reversely movable toward said discharge portion during return of said body to normal position, and means for accomplishing the said movements of said member which consist of rotatable means journalledly mounted on said body, flexible means secured to said member and drivingly coupling said member to said rotatable means, whereby upon rotation thereof said member is slidably moved along said body beneath said load in said opposing direction, and upon reverse rotation thereof said member is returned to its position adjacent the discharge portion of said body, and means supported by said frame engaging said rotatable means and adapted to effect rotation thereof responsive to tilting of said body, and to effect reverse rotation thereof responsive to return of said body to said normal position.

6. In combination with a dump truck, having a frame, a body hingedly secured to said frame, said body in normal position being adapted to receive and retain a load, said body being tiltable from normal position to effect discharge movement of said load from said body, and means for accomplishing tilting of said body and return thereof to normal position, means for assisting discharge of said load, comprising a member disposed transversely to the direction of said discharge movement in contact with said body adjacent the discharge portion thereof, said member being slidably movable along said body in a direction opposing the direction of said discharge movement during tilting of said body, to effect loosening of said load therefrom, and being reversely movable toward said discharge portion during return of said body to normal position, and means for accomplishing the said movements of said member which consist of rotatable means including a drum journalledly mounted on said body, flexible means secured to said member and drivingly coupling said member to said rotatable means, whereby upon rotation thereof said member is slidably moved along said body beneath said load in said opposing direction, and upon reverse rotation thereof said member is returned to its position adjacent the discharge portion of said body, and means supported by said frame which include an elongated vertically disposed bracket and a cable tautly supported by said bracket, said cable intermediate its length being wound about said drum, and adapted to effect rotation thereof responsive to tilting of said body, and to effect reverse rotation thereof responsive to return of said body to said normal position.

7. In combination with a dump truck, having a frame, a body hingedly secured to said frame, said body in normal position being adapted to receive and retain a load, said body being tiltable from normal position to effect discharge movement of said load from said body, and means for accomplishing tilting of said body and return thereof to normal position, means for assisting discharge of said load, comprising a member disposed transversely to the direction of said discharge movement in contact with said body adjacent the discharge portion thereof, said member being slidably movable along said body in a direction opposing the direction of said discharge movement during tilting of said body, to effect loosening of said load therefrom, and being reversely movable toward said discharge portion during return of said body to normal position, and means for accomplishing the said movements of said member which include a sprocket journalledly mounted on said body, flexible means secured to said member and drivingly coupling said member to said sprocket, whereby upon rotation thereof said member is slidably moved along said body beneath said load in said opposing direction, and upon reverse rotation thereof said member is returned to its position adjacent the discharge portion of said body, and means supported by said frame which comprise an elongated vertically disposed bracket and a chain supported by said bracket, said chain intermediate its length being held in operating engagement with said sprocket to effect rotation thereof responsive to tilting of said body, and to effect reverse rotation thereof responsive to return of said body to said normal position.

8. In combination with a dump truck, having a frame, a body hingedly secured at its rear end to said frame, said body in normal position being adapted to receive and retain a load, the forward end of said body being raisable to accomplish tilting of said body from normal position and effect rearward discharge movement of said load from said body, and means for raising and lowering the forward end of said body to respectively effect said tilting and return of said body to normal position, means for assisting discharge of said load, comprising a member disposed transversely of said body and in contact therewith adjacent the rear end thereof, said member consisting of an elongated plate having a longitudinal web portion spaced from said body and longitudinal edge portions flaring downwardly from said web portion into contact with said body and being slidably movable forwardly along said body during tilting thereof to effect loosening of said load therefrom, and being reversely movable toward said rear end during return of said body to normal position to remove load residue from said body, and means for accomplishing the said movements of said member which consist of rotatable means journalledly mounted on the forward portion of said body, flexible means secured to said member and drivingly coupling said member to said rotatable means, whereby upon rotation thereof said member is moved forwardly along said body beneath said load and upon reverse rotation thereof said member is returned rearwardly to its position adjacent the rear end of said body, and means supported by said frame engaging said rotatable means and adapted to effect rotation thereof responsive to tilting of said body and to effect reverse rotation thereof responsive to return of said body to said normal position.

9. In combination with a dump truck, having a frame, a body hingedly secured at its rear end to said frame, said body in normal position being adapted to receive and retain a load, the forward end of said body being raisable to accomplish tilting of said body from normal position and effect rearward discharge movement of said load from said body, and means for raising and lowering the forward end of said body to respectively effect said tilting and return of said body to normal position, means for assisting discharge of said load, comprising a member disposed transversely of said body and in contact therewith adjacent the rear end thereof, said member being slidably movable forwardly along said body during tilting thereof to effect loosening of said load therefrom, and being reversely movable toward said rear end during return of said body to normal position to remove load residue from said body, and means for accomplishing the said movements of said member which consist of a drum journalledly mounted on the forward portion of said body, flexible means secured to said member and drivingly coupling said member to said drum, whereby upon rotation thereof said member is moved forwardly along said body beneath said load and upon reverse rotation thereof said member is returned rearwardly to its position adjacent the rear end of said body, and means supported by said frame, including an elongated vertically disposed bracket and a cable tautly supported by said bracket, adapted to effect rotation of said drum responsive to tilting of said body and to effect reverse rotation thereof responsive to return of said body to said normal position, said cable intermediate its length being wound about said drum.

10. In combination with a dump truck, having a frame, a body hingedly secured at its rear end to said frame, said body in normal position being adapted to receive and retain a load, the forward end of said body being raisable to accomplish tilting of said body from normal position and effect rearward discharge movement of said load from said body, and means for raising and lowering the forward end of said body to respectively effect said tilting and return of said body to normal position, means for assisting discharge of said load, comprising a member disposed transversely of said body and in contact therewith adjacent the rear end thereof, said member being slidably movable forwardly along said body during tilting thereof to effect loosening of said load therefrom, and being reversely movable toward said rear end during return of said body to normal position to remove load residue from said body, and means for accomplishing the said movements of said member which consist of a sprocket journalledly mounted on the forward portion of said body, flexible means secured to said member and drivingly coupling said member to said sprocket, whereby upon rotation thereof said member is moved forwardly along said body beneath said load and upon reverse rotation thereof said member is returned rearwardly to its position adjacent the rear end of said body, and means supported by said frame, including an elongated vertically disposed bracket and a chain supported by said bracket, adapted to effect rotation of said sprocket responsive to tilting of said body and to effect reverse rotation thereof responsive to return of said body and to said normal position, said chain intermediate its length being held in operating engagement with said sprocket.

GROVER C. MALONE.
ELLIS M. MALONE.

REFERENCES CITED

The following references are of record in the file of this patent:

UNITED STATES PATENTS

| Number | Name | Date |
|---|---|---|
| 1,485,631 | Shea | Mar. 4, 1924 |
| 1,485,632 | Shea | Mar. 4, 1924 |

FOREIGN PATENTS

| Number | Country | Date |
|---|---|---|
| 294,048 | Great Britain | July 19, 1928 |